US008761441B2

(12) United States Patent
Kim et al.

(10) Patent No.: US 8,761,441 B2
(45) Date of Patent: Jun. 24, 2014

(54) SYSTEM AND METHOD FOR MEASURING FLIGHT INFORMATION OF A SPHERICAL OBJECT WITH HIGH-SPEED STEREO CAMERA

(75) Inventors: Jong Sung Kim, Daejeon (KR); Seong Min Baek, Daejeon (KR); Myung Gyu Kim, Daejeon (KR); Il Kwon Jeong, Daejeon (KR); Byoung Tae Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 317 days.

(21) Appl. No.: 13/316,356

(22) Filed: Dec. 9, 2011

(65) Prior Publication Data
US 2012/0148099 A1 Jun. 14, 2012

(30) Foreign Application Priority Data

Dec. 10, 2010 (KR) ........................ 10-2010-0126384

(51) Int. Cl.
*G06K 9/00* (2006.01)
(52) U.S. Cl.
USPC ........... 382/103; 473/199; 382/107; 382/173; 348/143
(58) Field of Classification Search
USPC ........................................................ 382/103
See application file for complete search history.

(56) References Cited

U.S. PATENT DOCUMENTS

| | | | | |
|---|---|---|---|---|
| 4,158,853 A * | 6/1979 | Sullivan et al. | ................ | 348/157 |
| 5,471,383 A * | 11/1995 | Gobush et al. | ................. | 700/91 |
| 5,489,099 A * | 2/1996 | Rankin et al. | ................. | 473/199 |
| 5,762,292 A * | 6/1998 | Schweyer et al. | ............ | 244/3.17 |
| 6,042,483 A * | 3/2000 | Katayama | ..................... | 473/199 |
| 6,226,416 B1 * | 5/2001 | Ohshima et al. | ............... | 382/289 |
| 6,233,007 B1 * | 5/2001 | Carlbom et al. | .............. | 348/157 |
| 6,241,622 B1 * | 6/2001 | Gobush et al. | ................ | 473/199 |
| 6,320,173 B1 * | 11/2001 | Vock et al. | ................. | 250/206.1 |

(Continued)

FOREIGN PATENT DOCUMENTS

| | | |
|---|---|---|
| JP | 2009-247642 A | 10/2009 |
| KR | 10-0871595 B1 | 11/2008 |
| KR | 10-0937922 B1 | 1/2010 |

OTHER PUBLICATIONS

Zupancic, T. et al., "Automatic Golf Ball Trajectory Reconstruction and Visualization", Proceeding MIRAGE '09 Proceedings of the 4th International Conference on Computer Vision/Computer Graphics CollaborationTechniques, pp. 150-160, Springer-Verlag Berlin, Heidelberg © 2009.*

(Continued)

*Primary Examiner* — Gandhi Thirugnanam

(57) ABSTRACT

Disclosed is a method for automatically extracting centroids and features of a spherical object required to measure a flight speed, a flight direction, a rotation speed, and a rotation axis of the spherical object in a system for measuring flight information of the spherical object with a high-speed stereo camera.

In order to automatically extract the centroids and the features of the spherical object, the present invention may automatically extract the centroid and the feature by detecting only the pixel of the foreground image including the spherical object generated by excluding the motionless background image from each camera image, sorting the interconnected pixels among the pixels of the detected foreground image into the independent pixel cluster, and then, using, in the extraction of the centroid and the feature, only one pixel cluster having a size similar to the actual spherical object.

18 Claims, 4 Drawing Sheets

(56) References Cited

U.S. PATENT DOCUMENTS

| | | | |
|---|---|---|---|
| 6,488,591 B1* | 12/2002 | Gobush et al. | 473/199 |
| 6,579,190 B2* | 6/2003 | Yamamoto | 473/141 |
| 6,592,465 B2* | 7/2003 | Lutz et al. | 473/198 |
| 6,731,805 B2* | 5/2004 | Brodsky et al. | 382/199 |
| 6,782,118 B2* | 8/2004 | Verga | 382/106 |
| 6,834,129 B2* | 12/2004 | Asakura | 382/289 |
| 7,286,159 B2* | 10/2007 | Yamamoto et al. | 348/157 |
| 7,324,663 B2* | 1/2008 | Kiraly | 382/103 |
| 7,822,229 B2* | 10/2010 | Pendleton et al. | 382/103 |
| 8,184,855 B2* | 5/2012 | Tong et al. | 382/103 |
| 8,280,112 B2* | 10/2012 | Casamona et al. | 382/103 |
| 2002/0085213 A1* | 7/2002 | Yamamoto et al. | 356/614 |
| 2004/0030527 A1* | 2/2004 | Rankin | 702/153 |
| 2004/0130567 A1* | 7/2004 | Ekin et al. | 345/723 |
| 2005/0233816 A1* | 10/2005 | Nishino et al. | 473/131 |
| 2007/0060410 A1* | 3/2007 | Gobush | 473/140 |
| 2007/0213139 A1* | 9/2007 | Stivers et al. | 473/199 |
| 2010/0210377 A1* | 8/2010 | Lock | 473/409 |
| 2011/0058708 A1* | 3/2011 | Ikenoue | 382/103 |
| 2011/0267461 A1* | 11/2011 | Birenboim et al. | 348/142 |
| 2012/0082347 A1* | 4/2012 | Kim et al. | 382/107 |
| 2012/0092342 A1* | 4/2012 | Suzuki et al. | 345/420 |
| 2012/0148099 A1* | 6/2012 | Kim et al. | 382/103 |
| 2013/0135466 A1* | 5/2013 | Kim et al. | 348/142 |
| 2013/0259304 A1* | 10/2013 | Aller | 382/103 |

OTHER PUBLICATIONS

Alexander Woodward et al., "Computer Vision for Low Cost 3-D Golf Ball and Club Tracking", Image and Vision Computing, 2005, New Zealand.

* cited by examiner

SYSTEM AND METHOD FOR MEASURING FLIGHT INFORMATION OF A SPHERICAL OBJECT WITH HIGH-SPEED STEREO CAMERA

CROSS-REFERENCE TO RELATED APPLICATIONS

This application claims priority to and the benefit of Korean Patent Application NO. 10-2010-0126384 filed in the Korean Intellectual Property Office on Dec. 10, 2010, the entire contents of which are incorporated herein by reference.

TECHNICAL FIELD

The present invention relates to measuring flight information of a spherical object with a high-speed stereo camera, and more particularly, to measuring flight information of a spherical object by automatically extracting centroids and features of the spherical object with a high-speed stereo camera.

BACKGROUND

Generally, in a sports game field using flight orbit simulation of a spherical object like a screen golf, processing of extracting centroids and features of the spherical object with a high-speed stereo camera needs to measure flight information such as an initial flight speed, a flight direction, a rotation speed, and a rotation axis of the spherical object necessary for flight orbit simulation of the spherical object.

As the related art for measuring the flight information with the high-speed camera, there are a point marker scheme of recognizing the features of the spherical object by attaching a point type marker to the spherical object and then, extracting the marker and a line marker scheme of extracting the features by attaching a line type marker to the spherical object and then calculating intersection points between lines.

The method of measuring flight information of a spherical object according to the related art may measure only the specific flight information in a restricted environment. There is a need for a complicated procedure of attaching in advance markers in a specific pattern such as the line marker and the point marker to the spherical object by a specific scheme such as a type of intersecting lines or a type of a point marker disposed to surround the line marker. The related art may not directly and automatically extract the centroids and the features of the spherical object from a pixel cluster corresponding to the spherical object, such that the accuracy of flight information may be relatively degraded and the flight information may not be rapidly measured.

SUMMARY

The present invention has been made in an effort to provide to a method and a system for accurately and rapidly measuring flight information of a spherical object by analyzing a general pattern such as a trade mark and a logo, or the like, of the spherical object and directly and automatically extracting centroids and features of the spherical object from a pixel cluster of the spherical object, without attaching in advance markers in a specific pattern such as a point marker or a line marker to the spherical object by a specific scheme.

An exemplary embodiment of the present invention provides a method for measuring flight information of a spherical object having a pattern with a stereo camera, the method including: generating a motionless background image using the stereo camera; removing the background image from each image photographed by the stereo camera to extract a foreground image including a spherical object; extracting a pixel cluster of the foreground image that is interconnected pixels from the pixels corresponding to the foreground image; extracting a pixel cluster of the spherical object that is the pixel cluster corresponding to the spherical object from the pixel cluster of the foreground image, based on the size of the pixel cluster of the foreground image; extracting a centroid of the spherical object and a spherical object region using the pixel cluster of the spherical object; extracting at least three features of the spherical object by analyzing a change in image brightness within the extracted spherical object region; and measuring flight information of the spherical object based on the extracted centroid and features.

The generating of the background image may determine the pixel of the background image by a mean or a median of pixel values of the photographed images for a predetermined time prior to measuring the flight information of the spherical object or determine the pixel of the background image by a probability distribution model.

The extracting of the foreground image may extract the foreground image by determining a binary mask value representing each of the background image and the foreground image using a distance metric.

The extracting of the pixel cluster of the foreground image may extract the pixel cluster of the foreground image by allocating the same label to the interconnected pixel using a connected component labeling method.

The extracting of the pixel cluster of the spherical object may determine, as the pixel cluster of the spherical object, the pixel cluster of the foreground image that has the minimum difference with the size of the spherical object from the pixel cluster of the foreground image.

The extracting of the centroid of the spherical object and the spherical object region may determine the centroid of the pixel cluster of the spherical object as the center of the spherical object and determine the spherical object region based on a minimum pixel value and a maximum pixel value in the pixel cluster of the spherical object.

The extracting of the features of the spherical object may include determining, as features, at least three pixels in which a change in image brightness exceeds a predetermined threshold within the spherical object region.

The method may further include extracting interconnectivity of features between images photographed by left and right cameras of the stereo cameras at the same time and extracting the interconnectivity of the features between adjacent images having a predetermined time interval.

The extracting of the interconnectivity may determine features having the interconnectivity as the features of the images when a similarity function value between the features of the images exceeds the predetermined threshold.

Another exemplary embodiment of the present invention provides a system for measuring flight information of a spherical object having a pattern with a stereo camera, the system including: a background image generation unit that generates a motionless background image using the stereo camera; a pixel cluster extraction unit that removes the background image from each image photographed by the stereo camera to extract a foreground image including a spherical object, extracts a pixel cluster of the foreground image that is interconnected pixels from the pixels corresponding to the foreground image, and extracts a pixel cluster of the spherical object that is the pixel cluster corresponding to the spherical object from the pixel cluster of the foreground image, based on the size of the pixel cluster of the foreground image; a centroid extraction unit that extracts a centroid of the spherical object and a spherical object region using the pixel cluster of the spherical object; a feature extraction unit that extracts at least three features of the spherical object by analyzing a change in image brightness within the extracted spherical object region; and a calculation unit that calculates the flight information of the spherical object based on the extracted centroid and features.

The background image generation unit may determine the pixel of the background image by a mean or a median of pixel values of the photographed images for a predetermined time prior to measuring the flight information of the spherical object or determine the pixel of the background image by a probability distribution model.

The pixel cluster extraction unit may extract the foreground image by determining a binary mask value representing each of the background image and the foreground image using a distance metric.

The pixel cluster extraction unit may extract the pixel cluster of the foreground image by allocating the same label to the interconnected pixel using a connected component labeling method.

The pixel cluster extraction unit may determine, as the pixel cluster of the spherical object, the pixel cluster of the foreground image that has the minimum difference with the size of the spherical object from the pixel cluster of the foreground image.

The centroid extraction unit may determine the centroid of the pixel cluster of the spherical object as the center of the spherical object and determine the spherical object region based on a minimum pixel value and a maximum pixel value in the pixel cluster of the spherical object.

The feature extraction unit may determine, as features, at least three pixels exceeding a threshold in which a change in image brightness is predetermined within the spherical object region.

The system may further include a connectivity extraction unit extracting interconnectivity of features between images photographed by left and right cameras of the stereo cameras at the same time and extracting the interconnectivity of the features between adjacent images having a predetermined time interval.

The connectivity extraction unit may determine as the features having the interconnectivity when a similarity function value between the features of the images exceeds the predetermined threshold.

According to exemplary embodiments of the present invention, it is possible to more accurately and rapidly measure the flight information without errors by directly calculating the centroids of the spherical object from the pixel cluster corresponding to the spherical object and automatically extracting the features by analyzing the change in image brightness in a pixel cluster of a spherical object using the general patterns such as a trade mark or a logo of the spherical object rather than using the markers in the specific pattern such as the point marker and the line marker arranged in the specific scheme.

According to exemplary embodiments of the present invention, it is possible to accurately and reliably measure the flight information of the spherical object without the complicated process of attaching in advance the markers in the specific pattern such as the point marker and the line marker to the spherical object in the specific scheme, unlike the related art.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1A:
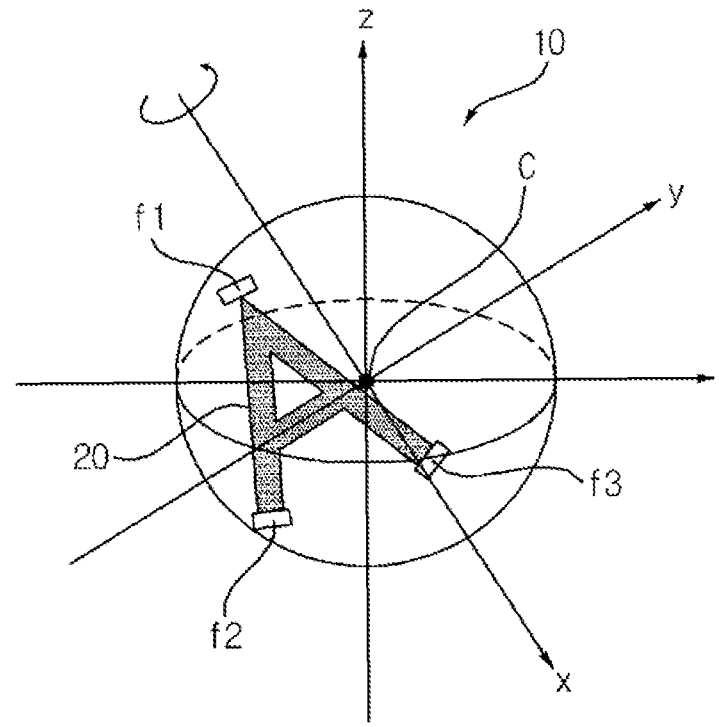
FIG. 1A and FIG. 1B are a diagram showing a spherical object in measuring flight information of a spherical object with a high-speed stereo camera according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

A general pattern described in the present specification is a term in contrast with a specific pattern such as a line type marker, a point type marker, or the like, attached in advance to a spherical object in a specific scheme in order to obtain flight information of a spherical object and is referred to as a general pattern of the spherical object such as a trade mark and a logo on the spherical object. A foreground image described in the present specification means an image portion including the spherical object other than the motionless background image portion in a single photographed image.

The specific terms used in the following description are provided in order to help understanding of the present invention. The use of the specific terms may be changed into other forms without departing from the technical idea of the present invention.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Hereinafter, exemplary embodiments of the present invention will be described in detail with reference to the accompanying drawings.

Figure 1B:
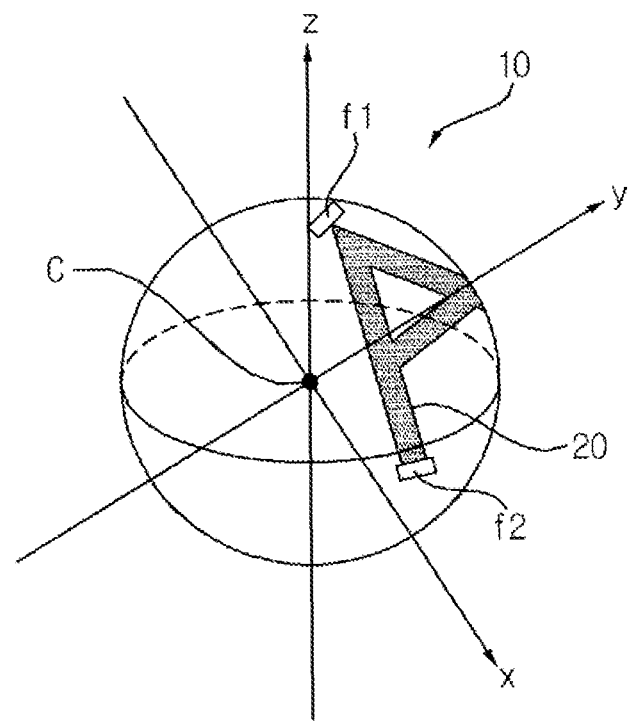

FIGS. 1A and 1B are diagrams showing a spherical object in measuring flight information of a spherical object with a high-speed stereo camera according to an exemplary embodiment of the present invention. FIG. 1B shows a spherical object after being rotated in an x-axis direction of FIG. 1A, wherein a y axis represents a flight direction of a spherical object 10 from a start point of a spherical object, an x-axis represents left and right flight directions of the spherical object 10, and a z-axis represents a height of the spherical object 10.

The spherical object 10 has a centroid C and has a general pattern 20 called logo 'A'. The general pattern 20 has features f1, f2, and f3. The automatic extraction of the centroid C and the features f1, f2, and f3 of the spherical object 10 required to measure flight information such as a flight speed, a flight direction, a rotation speed, and a rotation axis using the general pattern 20 of the spherical object 10 will be described in detail below.

Figure 2:
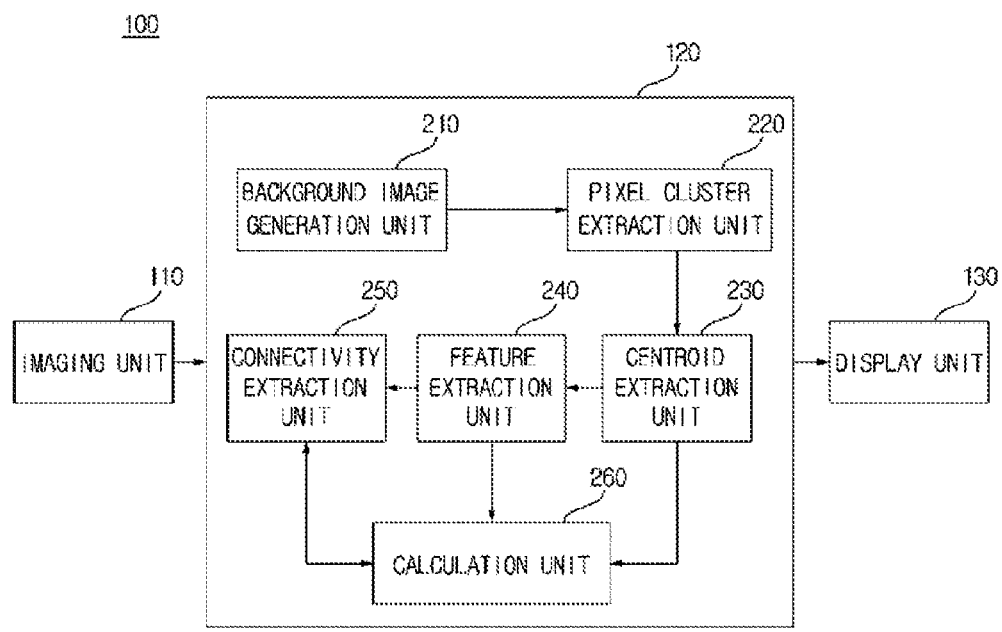
FIG. 2 is a block diagram showing a system for measuring flight information of a spherical object with a high-speed stereo camera according to an exemplary embodiment of the present invention.

FIG. 2 is a block diagram showing a system for measuring flight information of a spherical object with a high-speed stereo camera according to an exemplary embodiment of the present invention. A system 100 for measuring flight information of a spherical object includes an imaging unit 110, a processing unit 120, and a display unit 130.

The imaging unit 110 includes left and right stereo cameras and photographs flight of the spherical object 10 and provides the photographed flight to the processing unit 120.

The processing unit 120 includes a background image generation unit 210, a pixel cluster extraction unit 220, a centroid extraction unit 230, a feature extraction unit 240, a connectivity extraction unit 250, and a calculation unit 260.

The background image generation unit 210 generates a background image without a spherical object as a motionless image portion, wherein the background image may be generated by photographing a background, which does not include the spherical object 10, by a stereo camera of the imaging unit 110 for a predetermined time before measuring the flight information.

The pixel cluster extraction unit 220 removes pixels of the background image from the images photographed by the camera in the imaging unit 110 to extract the pixels of the foreground image and sorts the extracted pixels of the foreground image into the interconnected cluster to extract the pixel cluster of the foreground image. The pixel cluster extraction unit 220 also obtains the size of the extracted pixel cluster of the foreground image to extracts the pixel cluster having the size the most approximate to the spherical object as the pixel cluster corresponding to the spherical object 10.

The centroid extraction unit 230 receives the data about the pixel cluster of the spherical object from the pixel cluster extraction unit 220 to extract the centroid of the pixel cluster of the spherical objects as the centroid of the spherical object. The data about the centroid of the spherical object is transmitted to the calculation unit 260 so as to measure the flight speed and the flight direction of the spherical object 10. The centroid extraction unit 230 also extracts the pixel at the uppermost left point and the pixel at the lowermost right point from the pixel cluster of the spherical object to extract a spherical object region in which the spherical object is positioned. The data about the extracted spherical object region is transmitted to the feature extraction unit 240 so as to extract the feature.

The feature extraction unit 240 determines at least three pixels exceeding a threshold in which the change in image brightness is predetermined in the spherical object region and determines the pixels as the feature. The data about the extracted feature is transmitted to the connectivity extraction unit 250 and the calculation unit 260.

The connectivity extraction unit 250 extracts the interconnectivity of the feature between the left and right camera images at the same time and the interconnectivity of the feature between the adjacent images having a predetermined time interval using a similarity function. The data about the interconnectivity of the feature is transmitted to the calculation unit 260.

The calculation unit 260 receives the data about the centroid of the spherical object 10 from the centroid extraction unit 230, the data about the feature of the spherical object 10 from the feature extraction unit 240, and the data about the interconnectivity of the feature from the connectivity extraction unit 250 to calculate the flight information such as the flight speed, the flight direction, the rotation speed, and the rotation axis using the centroid, the feature, and the feature interconnectivity. The calculation unit 260 calculates the flight speed and the flight direction of the spherical object 10 based on the movement of the centroid of the spherical object 10 between images having the predetermined time interval and obtains a rotation matrix of the feature of the spherical object 10 having the interconnectivity between the images having the predetermined time interval to obtain the rotation speed and the rotation axis of the spherical object 10.

The display unit 130 receives the image processed in the processing unit 120 and displays the received image on the screen.

Figure 3:
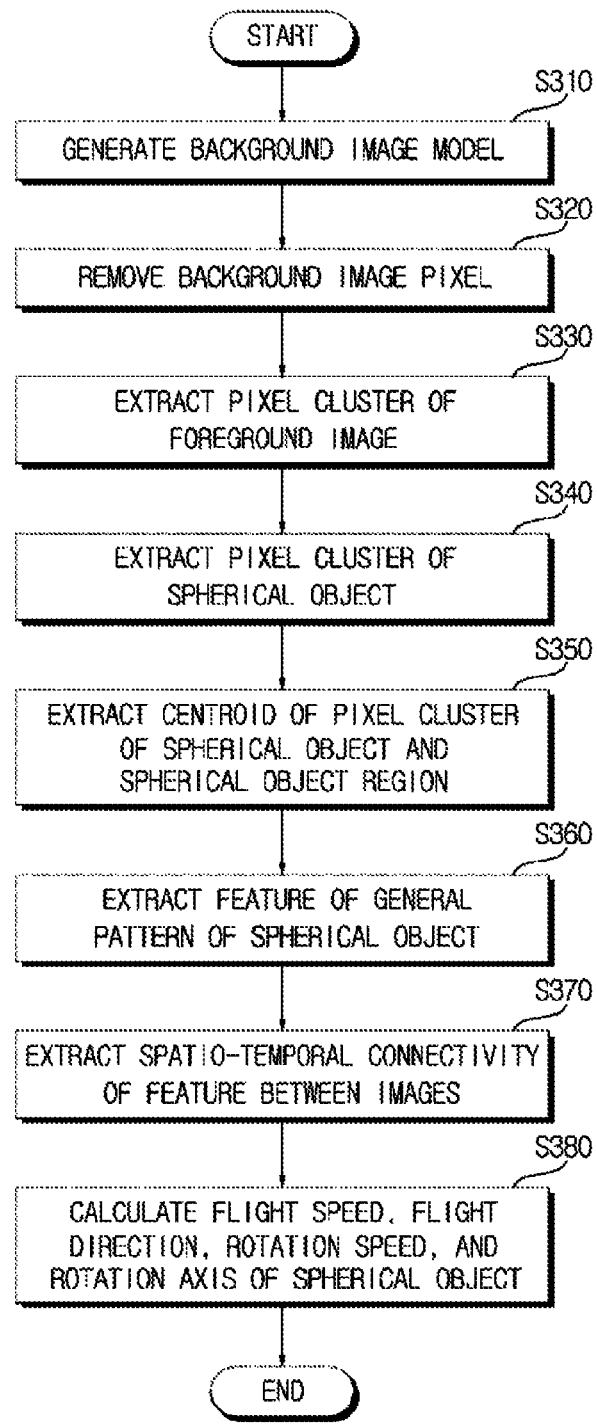
FIG. 3 is a flow chart showing a method for measuring flight information of a spherical object with a high speed stereo camera according to an exemplary embodiment of the present invention.

FIG. 3 is a flow chart showing a method for measuring flight information of a spherical object with a high speed stereo camera according to an exemplary embodiment of the present invention. FIGS. 4A to 4G are diagrams showing an image for explaining each step of the method for measuring flight information of a spherical object with a high-speed stereo camera according to an exemplary embodiment of the present invention. Hereinafter, the image of the left camera of the stereo camera will be mainly described, but it is understood by those skilled in the art that the same manner as the image of the left camera is also applied to the image of the right camera.

Figure 4:
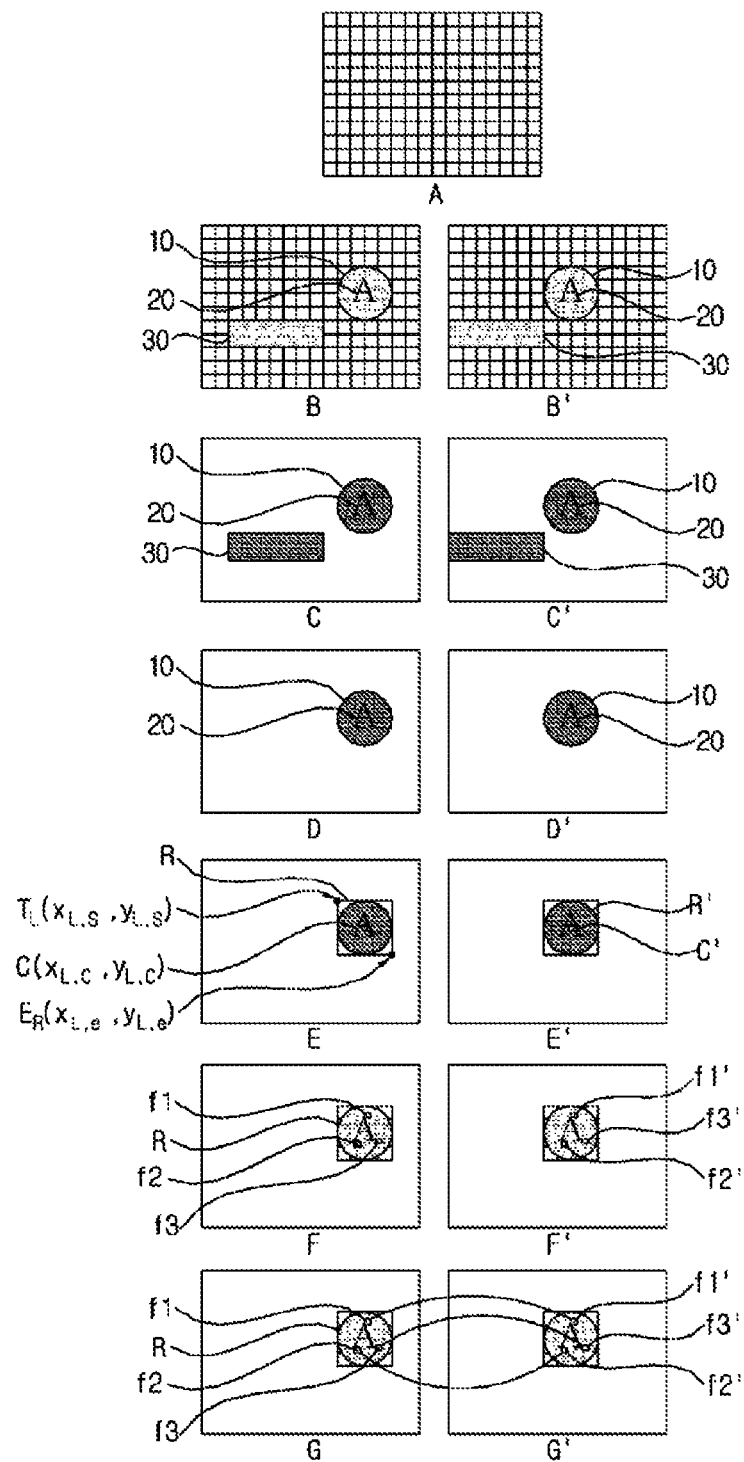
FIG. 4 is a diagram showing an image for explaining each step of the method for measuring flight information of a spherical object with a high-speed stereo camera according to an exemplary embodiment of the present invention.

Referring to FIGS. 3 and 4A, the background image is first generated so as to differentiate the foreground image including the image of the spherical object 10 from the photographed image (S310). The background image is a motionless region that does not include the spherical object 10 as shown in FIG. 4A, which has the same form as the camera image for convenience of calculation. The background image may be generated by photographing the background that does not include the spherical object 10 by the high-speed stereo camera for the predetermined time before the flight information is measured. Alternatively, the background image model may be automatically generated from the pixel of the background image removed after the flight information is measured. Each pixel value in the background image may be determined by a mean or a median of the corresponding pixel values of the images photographed for the predetermined time before the flight information is measured or may be determined by a mode of a probability model by calculating a distribution of the pixel values through a probability model such as Gaussian.

Then, the pixels of the background image generated at S310 are removed from the images photographed by the left camera (S320). The image photographed by the left camera is an image including the image of the spherical object 10 having the general pattern 20 like logo 'A' as shown in FIG. 4B. In order to remove the pixels of the background image, the pixels of the background image are removed from the photographed image by determining the pixels of the background image by comparing a distance metric determined according to the background image model with the predetermined threshold and then, removing the pixels determined as the pixel of the background image in the subsequent image processing process. In this case, the pixel of the background image may be determined using the following Equation 1.

$$D(I_L(x,y), B_L(x,y)) \leq D_{th} \quad \text{[Equation 1]}$$

Herein, D is the distance metric determined according to the background image model, and as the distance metric, Euclidean or Mahalanobis distance metric, or the like, may be used. Dth is a threshold of the predetermined distance metric. IL is an image photographed through the left camera so as to measure the flight information of the spherical object 10 and BL is a background image corresponding to the image of the left camera.

As can be appreciated from Equation 1, when the distance metric D between a pixel (IL(x,y)) in the photographed image and a pixel (BL(x,y)) in the background image is equal to or less than a threshold, it is determined that the corresponding pixel corresponds to the background image. That is, when the distance metric D between a pixel (IL(x,y)) in the photographed image and a pixel (BL(x,y)) in the background image exceeds a threshold, it is determined that the corresponding pixel corresponds to the foreground image including the spherical object 10.

Since the background image does not include the spherical object 10, the pixel corresponding to the background image is automatically processed so as to be removed from the photographed image. In this case, the binary mask may be used so as to remove the pixel of the background image. After generating the binary mask (ML) having the same magnitude as the photographed image (IL), the value (ML(x,y)) of the binary mask is set to be '0' when the pixel (IL(x,y)) of the photographed image is a pixel of the background image and the value (ML(x,y)) of the binary mask is set to be '1' when the pixel (IL(x,y)) of the photographed image is a pixel of the foreground image, such that the pixel of the background image may be removed from the photographed image.

Next, the pixel cluster of the foreground image is extracted from the foreground image from which the background image is removed (S330). FIG. 4C is an image showing the pixel cluster corresponding to the foreground image from which the background image is removed. The pixel clusters 10 and 30 corresponding to the foreground image are extracted by applying a connected component labeling method to the binary mask (ML) generated at S320 to allocate the same label to an interconnected element of each element of the binary mask (ML) corresponding to the pixel of the foreground image.

Next, the pixel cluster corresponding to the spherical object 10 is extracted from the pixel cluster of the extracted foreground image (S340). FIG. 4D is an image showing the pixel cluster corresponding to the spherical object 10 extracted from the foreground image from which the background image is removed. The pixel clusters 10 and 30 of the foreground image extracted through the connected component labeling method at S330 may be at least two or more due to a cause such as an image noise, a background image removal error, or the like. The pixel cluster of the i-th foreground image extracted by applying the connected component labeling method to the binary mask (ML) may be represented by $CL,i \equiv \{(x1, y1), \ldots, (xAL,i, yAL,i))\}$. Herein, AL,i represents the number of pixels belonging to the pixel cluster CL,i of the i-th foreground image. In order to extract the pixel cluster corresponding to the spherical object 10 from the pixel clusters 10 and 30 of at least two foreground images, only the pixel cluster (CL,i*) of the i*-th foreground image satisfying the following Equation 2 is sorted into the pixel cluster of the foreground image corresponding to the spherical object 10.

$$i^* = \min_i (\min(|A_{L,i} - A_{min}|, \min(|A_{L,i} - A_{max}|)) \quad \text{[Equation 2]}$$

Herein, AL,i, which is the number of pixels belonging to the corresponding cluster, represents the size of the corresponding cluster, Amin represents a minimum value of the predetermined size of the spherical object 10, and Amax represents a maximum value of the predetermined size of the spherical object 10.

As can be appreciated from Equation 2, the pixel cluster satisfying Equation 2, which is a pixel cluster of the foreground image corresponding to the spherical object, is a pixel cluster having a size the most approximate to the size of the spherical object among the pixel clusters of each foreground image. Other pixel clusters other than the pixel cluster (CL, I*) of the foreground image satisfying Equation 2, which are the pixel cluster out of the range of the size of the spherical object, are determined as a pixel cluster that has no information on the spherical object 10 and then, are excluded from the process of extracting the centroid and feature of the spherical object 10.

Next, the centroid C and the spherical object region R of the spherical object 10 are extracted from the pixel cluster (CL, i*) of the foreground image corresponding to the spherical object 10 (S350). FIG. 4E shows the spherical object 10 having the centroids (C(xL,c, yL,c)) and the spherical object region R including the spherical object 10. First, the centroids (C(xL,c, yL,c)) of the spherical object 10 are calculated using the following Equation 3.

$$x_{L,c} = \frac{1}{A_{L,i}} \sum_{k=1}^{A_{L,i}} x_k \quad \text{[Equation 3]}$$

$$y_{L,c} = \frac{1}{A_{L,i}} \sum_{k=1}^{A_{L,i}} y_k$$

Herein, AL,i, which is the number of pixels belonging to the pixel cluster (CL,I*) of the foreground image corresponding to the spherical object, represents the size of the corresponding cluster.

Then, as shown in FIG. 4E, the spherical object region R including the spherical object 10 is extracted. The spherical object region R is required to automate the feature extraction processing later and is calculated from the pixel cluster (CL, i*) of the foreground image corresponding to the spherical object 10. The uppermost left point (TL(xL,s,yL,s)) and the lowermost right point (ER(xL,e,yL,e)) of the spherical object region R on the left camera image IL in the pixel cluster (CL,i*) of the spherical object are calculated using the following Equation 4.

$$x_{L,s} = \min_k x_k$$

$$y_{L,s} = \min_k y_k$$

$$x_{L,e} = \max_k x_k$$

$$y_{L,e} = \max_k y_k \qquad \text{[Equation 4]}$$

Next, at least three features of the general pattern 'A' on spherical object 10 are extracted using the spherical object region R extracted in the above steps (S360).

As shown in FIG. 4F, the features f1, f2, and f3 of the spherical object 10 are calculated by applying the feature function S(x,y) represented by Equation 5 to all the pixel positions (x,y) within the left camera image included in the spherical object region R.

$$S(x, y) = \left\{ \left\langle \left(\frac{\delta I_L}{\delta x}\right)^2 \right\rangle \left\langle \left(\frac{\delta I_L}{\delta y}\right)^2 \right\rangle - \left\langle \left(\frac{\delta I_L}{\delta x}\right)\left(\frac{\delta I_L}{\delta y}\right)\right\rangle^2 - 0.04 \left( \left\langle \left(\frac{\delta I_L}{\delta x}\right)^2 \right\rangle + \left\langle \left(\frac{\delta I_L}{\delta y}\right)^2 \right\rangle \right) \right\} S_{th} \qquad \text{[Equation 5]}$$

Herein, < > represents a mean within a predetermined range based on each pixel included in the spherical object region R and Sth represents a threshold for the predetermined feature function value.

$$\frac{\delta I_L}{\delta y}$$

represents the change in image brightness in an x-axis direction and a y-axis direction, respectively, δx and δy and are generally 1.

When the value of the feature function S(x,y) exceeds the threshold value Sth at the pixel position (x,y) included in the spherical object region R, the corresponding pixel (x,y) is determined as the features f1, f2, and f3. Consequently, the extracted features f1, f2, and f3 correspond to a point at which the change in image brightness is maximum in the local image region. Thereby, all the features f1, f2, and f3 of the general pattern 'A' on the spherical object 10 may be automatically extracted from the left camera image IL. Meanwhile, the centroids and all the features of the spherical object may also be automatically extracted from the right camera image by applying S310 to S360 to the right camera image IR.

Next, the spatio-temporal interconnectivity between the features of the spherical object 10 is extracted through the matching of the feature between the left and right stereo images at the same time (S370). That is, as shown in FIG. 4G, the interconnectivity between the feature (x,y) extracted from the left camera image (IL) and the feature (x',y') extracted from the right camera image (IR) is calculated using the similarity function C(x,y) of the following Equation 6.

$$C(I_L(x, y), I_R(x', y')) = \qquad \text{[Equation 6]}$$

$$\frac{\langle (I_L(x, y) - \langle I_L(x, y)\rangle)(I_R(x', y') - \langle I_R(x', y')\rangle)\rangle}{\sqrt{\langle (I_L(x, y) - \langle I_L(x, y)\rangle)^2 \rangle} \sqrt{\langle (I_R(x', y') - \langle I_R(x', y')\rangle)^2 \rangle}} > C_{th}$$

Herein, Cth is a threshold for the predetermined similarity function value.

When the similarity function value between the feature (x,y) extracted from the left camera image IL and the feature (x',y') extracted from the right camera image IR exceeds the predetermined threshold Cth, the feature (x,y) extracted from the left camera image (IL) and the feature (x',y') extracted from the right camera image (IR) are determined as the interconnected feature. Thereby, it is determined that the features f1, f2, and f3 in the left camera image IL are each interconnected with the features f1', f2', and f3' in the right camera image (IR).

Finally, the flight information of the spherical object 10 is calculated based on the centroid and the feature of the spherical object 10 (S380). First, the flight speed and the flight direction among the flight information of the spherical object 10 are calculated using the centroids (CL and CR) of the spherical object extracted from the pixel cluster (CL,i*) of the spherical object 10. The three-dimensional centroid position coordinates ($X_c^t$, $Y_c^t$, $Z_c^t$) of the spherical object at the current photographing time t are calculated using triangulation through the left camera and the right camera from the centroids (CL(xL,c, yL,c)) of the spherical object extracted from the left camera image IL and the centroids (CR(xR,c, yR,c)) of the spherical object extracted from the right camera image IR. The three-dimensional centroid position coordinates ($X_c^{t+\delta t}$, $Y_c^{t+\delta t}$, $Z_c^{t+\delta t}$) of the spherical object at the next photographing time (t+δt) are calculated by the same method. A linear velocity vector v required to calculate the flight speed and the flight direction of the spherical object using the movement of the three-dimensional centroid position between the adjacent images having the calculated predetermined interval (δt), that is, between the image at the current photographing time (t) and the image at the next photographing time (t+δt), is calculated using the following Equation 7.

$$v = \left( \frac{X_c^{t+\delta t} - X_c^t}{\delta t}, \frac{Y_c^{t+\delta t} - Y_c^t}{\delta t}, \frac{Z_c^{t+\delta t} - Z_c^t}{\delta t} \right) \qquad \text{[Equation 7]}$$

The flight speed of the spherical object 10 is calculated from $$\frac{\|v\|}{\delta t}$$

using the size of the linear velocity vector ||v|| calculated in Equation 7. The flight direction of the spherical object is calculated from $$\frac{v}{\|v\|}$$

using the size of the linear velocity vector ||v|| calculated in Equation 7. Herein, δt, which is a photographing time interval, is determined according to the photographing speed of the used high-speed stereo camera.

Alternatively, the process of measuring the flight speed and the flight direction of the spherical object 10 using the centroids of the spherical object 10 may be immediately performed after extracting the centroids of the spherical object 10 at S350.

Meanwhile, the rotation speed and the rotation axis among the flight information of the spherical object are calculated using the feature of the spherical object. In more detail, by the same method as the method representing the centroids of the spherical object 10 in the image photographed by the above-mentioned left and right stereo cameras by the three-dimensional position coordinates, the three-dimensional feature position coordinates $(X^t, Y^t, Z^t)$ of the spherical object at the current photographing time t from the feature (x,y) of the spherical object extracted from the left camera image (IL) and the feature (x',y') of the spherical object extracted from the right camera image (IR) having the interconnectivity with the feature of the spherical object extracted from the left camera image (IL) are calculated by triangulation through the left camera and the right camera. The three-dimensional feature position coordinates $(X^{t+\delta t}, Y^{t+\delta t}, Z^{t+\delta t})$ of the spherical object at the next photographing time (t+δt) by the same method are calculated.

Then, the interconnectivity between the three-dimensional feature position of the spherical object at the current photographing time (t) and the three-dimensional feature position of the spherical object at the next photographing time (t+δt) is extracted by using the similarity function of Equation 6. The rotation matrix R3×3 between the three-dimensional position $(X^t, Y^t, Z^t)$ and $(X^{t+\delta t}, Y^{t+\delta t}, Z^{t+\delta t})$ of the feature having the interconnectivity is calculated by an absolute orientation method. The rotation speed $$\left(\frac{\theta}{\delta t}\right)$$

and the rotation axis (w(wx,wy,wz)) of the spherical object are calculated from the calculated rotation matrix R3×3 using the following Equation 8.

$$R_{3/3} = I_{3\times 3} + \begin{pmatrix} 0 & -\omega_z & \omega_y \\ \omega_z & 0 & -\omega_x \\ -\omega_y & \omega_x & 0 \end{pmatrix}\sin\theta +$$
$$\begin{pmatrix} \omega_x^2 - 1 & \omega_x\omega_y & \omega_x\omega_z \\ \omega_x\omega_y & \omega_y^2 - 1 & \omega_y\omega_z \\ \omega_x\omega_z & \omega_y\omega_z & \omega_z^2 - 1 \end{pmatrix}(1 - \cos\theta)$$

[Equation 8]

As described above, the exemplary embodiment of the present invention can measure the flight information by directly and automatically extracting the centroids and the features of the spherical object from the general pattern like a trade mark and a logo on the spherical object without attaching in advance markers in a specific pattern such as a point type marker or a line type marker to the spherical object by a specific scheme. In order to automatically extract the centroids and the features of the spherical object, the present invention may automatically extract the centroid and the feature by detecting only the pixel of the foreground image including the spherical object generated by excluding the motionless background image from each camera image, sorting the interconnected pixels among the pixels of the detected foreground image into the independent pixel cluster, and then, using, in the extraction of the centroid and the feature, only one pixel cluster having a size similar to the actual spherical object. The present invention directly calculates the centroids of the spherical object from the pixel cluster of the spherical object, and analyzes the change in brightness and structure in the corresponding image region in the pixel cluster of the spherical object to automatically extract the features, thereby more accurately and rapidly measuring the flight information of the spherical object.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for measuring flight information of a spherical object having a pattern with a stereo camera, the method comprising:
   generating a motionless background image using the stereo camera;
   removing the background image from each image photographed by the stereo camera to extract a foreground image including the spherical object;
   extracting a pixel cluster of the foreground image that is interconnected pixels from the pixels corresponding to the foreground image;
   extracting a pixel cluster of the spherical object that is the pixel cluster corresponding to the spherical object from the pixel cluster of the foreground image, based on the size of the pixel cluster of the foreground image;
   extracting centroids of the spherical object and a spherical object region using the pixel cluster of the spherical object;
   extracting at least three features of the spherical object by analyzing a change in image brightness within the extracted spherical object region; and
   measuring flight information of the spherical object based on the extracted centroid and features.

2. The method of claim 1, wherein the generating of the background image determines the pixel of the background image by a mean or a median of pixel values of the photographed images for a predetermined time prior to measuring the flight information of the spherical object or determines the pixel of the background image by a probability distribution model.

3. The method of claim 1, wherein the extracting of the foreground image extracts the foreground image by determining a binary mask value representing each of the background image and the foreground image using a distance metric.

4. The method of claim 1, wherein the extracting of the pixel cluster of the foreground image extracts the pixel cluster of the foreground image by allocating the same label to the interconnected pixel using a connected component labeling method.

5. The method of claim 1, wherein the extracting of the pixel cluster of the spherical object determines, as the pixel cluster of the spherical object, the pixel cluster of the foreground image that has the minimum difference with the size of the spherical object from the pixel cluster of the foreground image.

6. The method of claim 1, wherein the extracting of the centroid of the spherical object and the spherical object region determines the centroid of the pixel cluster of the spherical object as the center of the spherical object and determines the spherical object region based on a minimum pixel value and a maximum pixel value in the pixel cluster of the spherical object.

7. The method of claim 1, wherein the extracting of the features of the spherical object includes determining, as features, at least three pixels exceeding a threshold in which a change in image brightness is predetermined within the spherical object region.

8. The method of claim 1, further comprising extracting interconnectivity of features between images photographed by left and right cameras of the stereo cameras at the same time and extracting the interconnectivity of the features between adjacent images having a predetermined time interval.

9. The method of claim 8, wherein the extracting of the interconnectivity determines features having the interconnectivity as the features of the images when a similarity function value between the features of the images exceeds the predetermined threshold.

10. A system for measuring flight information of a spherical object having a pattern with a stereo camera, the system comprising:
a background image generation unit that generates a motionless background image using the stereo camera;
a pixel cluster extraction unit that removes the background image from each image photographed by the stereo camera to extract a foreground image including a spherical object, extracts a pixel cluster of the foreground image that is interconnected pixels from the pixels corresponding to the foreground image, and extracts a pixel cluster of the spherical object that is the pixel cluster corresponding to the spherical object from the pixel cluster of the foreground image, based on the size of the pixel cluster of the foreground image;
a centroid extraction unit that extracts centroids of the spherical object and a spherical object region using the pixel cluster of the spherical object;
a feature extraction unit that extracts at least three features of the spherical object by analyzing a change in image brightness within the extracted spherical object region; and
a calculation unit that calculates the flight information of the spherical object based on the extracted centroid and features.

11. The system of claim 10, wherein the background image generation unit determines the pixel of the background image by a mean or a median of pixel values of the photographed images for a predetermined time prior to measuring the flight information of the spherical object or determines the pixel of the background image by a probability distribution model.

12. The system of claim 10, wherein the pixel cluster extraction unit extracts the foreground image by determining a binary mask value representing each of the background image and the foreground image using a distance metric.

13. The system of claim 10, wherein the pixel cluster extraction unit extracts the pixel cluster of the foreground image by allocating the same label to the interconnected pixel using a connected component labeling method.

14. The system of claim 10, wherein the pixel cluster extraction unit determines, as the pixel cluster of the spherical object, the pixel cluster of the foreground image that has the minimum difference with the size of the spherical object from the pixel cluster of the foreground image.

15. The system of claim 10, wherein the centroid extraction unit determines the centroid of the pixel cluster of the spherical object as the center of the spherical object and determines the spherical object region based on a minimum pixel value and a maximum pixel value in the pixel cluster of the spherical object.

16. The system of claim 10, wherein the feature extraction unit determines, as features, at least three pixels exceeding a threshold in which a change in image brightness is predetermined within the spherical object region.

17. The system of claim 10, further comprising a connectivity extraction unit extracting interconnectivity of features between images photographed by left and right cameras of the stereo cameras at the same time and extracting the interconnectivity of the features between adjacent images having a predetermined time interval.

18. The system of claim 17, wherein the connectivity extraction unit determines features having the interconnectivity as the features of the images when a similarity function value between the features of the images exceeds the predetermined threshold.

* * * * *